United States Patent [19]

Erickson et al.

[11] Patent Number: 5,531,975
[45] Date of Patent: Jul. 2, 1996

[54] PROCESS FOR THE PRODUCTION OF PHOSPHORIC ACID AND CALCIUM FLUORIDE

[75] Inventors: William R. Erickson, Lakeland; Leif E. Bouffard, Mulberry, both of Fla.

[73] Assignee: Phosphate Engineering and Construction Co., Inc., Lakeland, Fla.

[21] Appl. No.: 437,671

[22] Filed: May 9, 1995

Related U.S. Application Data

[63] Continuation-in-part of Ser. No. 160,629, Dec. 2, 1993, Pat. No. 5,427,757, which is a continuation of Ser. No. 962,271, Oct. 16, 1992, abandoned, which is a division of Ser. No. 808,641, Dec. 17, 1991, Pat. No. 5,180,569, which is a continuation-in-part of Ser. No. 636,254, Dec. 31, 1990, abandoned.

[51] Int. Cl.⁶ ............................. C01B 25/22; C01F 11/22
[52] U.S. Cl. ....................... 423/319; 423/157.3; 423/490
[58] Field of Search .................................. 423/319, 483, 423/157.3

[56] References Cited

U.S. PATENT DOCUMENTS

| | | | |
|---|---|---|---|
| 1,313,379 | 8/1919 | Heckenbleikner | 423/319 |
| 2,398,135 | 9/1943 | Frey . | |
| 2,456,509 | 12/1948 | Hopkins et al. . | |
| 2,507,605 | 5/1950 | Lopker et al. . | |
| 2,636,806 | 4/1953 | Winter | 423/319 |
| 2,702,233 | 2/1955 | Mitchell et al. . | |
| 2,725,634 | 12/1955 | Miller | 423/319 |
| 3,323,864 | 8/1963 | Lapple . | |
| 3,811,246 | 5/1974 | Erickson . | |
| 3,825,655 | 7/1974 | Eipeltauer et al. | 423/483 |
| 4,557,915 | 12/1985 | Nineuil | 423/319 |
| 4,629,610 | 12/1986 | Friese et al. | 423/240 K |
| 5,180,569 | 1/1993 | Erickson et al. | 423/157.3 |
| 5,427,757 | 6/1995 | Erickson et al. | 423/157.3 |

FOREIGN PATENT DOCUMENTS

| | | | |
|---|---|---|---|
| 87323 | 8/1983 | European Pat. Off. . | |
| 551248 | 5/1977 | U.S.S.R. | 423/319 |
| 2694282 | 9/1982 | United Kingdom | 423/319 |

OTHER PUBLICATIONS

U.S. Dept. of Interior Report of Investigations 8061, Fluosilicic Acid Acidulation of Phosphate Rock, by L. H. Banning, Albany Metallurgy Research Center, Albany, Oregon (1975).
Chemical Abstracts, vol. 84, No. 18, 3 May 1976 (Columbus, Ohio US) H. Lloyd Banning: "Fluosilicic Acid Acidulation of Phosphate Rock," p. 127 abstract No. 123995v, and U.S., Bur. Mines, Rep. Invest. 1975, RI 8061, 13 pages.
Chemical Abstracts 97(21):181101(e).
Chemical Abstracts 78(8):519775.

*Primary Examiner*—Wayne Langel
*Attorney, Agent, or Firm*—James E. Shipley

[57] ABSTRACT

Fluosilicic acid is reacted with phosphate rock in order to produce wet process phosphoric acid and calcium fluoride which is later reacted with sulfuric acid to produce hydrogen fluoride and calcium sulfate. The hydrogen fluoride is then stripped from the phosphoric acid and recovered as either anhydrous hydrogen fluoride or concentrated hydrofluoric acid or reacted with aluminum trihydrate to produce aluminum fluoride; with sodium carbonate to produce sodium fluoride/bifluoride; or with ammonia to produce ammonium fluoride/bifluoride.

5 Claims, 5 Drawing Sheets

PROCESS FOR THE PRODUCTION OF PHOSPHORIC ACID AND CALCIUM FLUORIDE

BACKGROUND OF THE INVENTION

This application is a continuation-in-part of U.S. patent application Ser. No. 08/160,629, filed Dec. 2, 1993, U.S. Pat. No. 5,427,757, which was a continuation of U.S. patent application Ser. No. 07/962,271, filed Oct. 16, 1992, now abandoned, which was a divisional of U.S. patent application Ser. No. 07/808,641, filed Dec. 17, 1991, which issued as U.S. Pat. No. 5,180,569 on Jan. 19, 1993, and which was a continuation-in-part of U.S. patent application Ser. No. 07/636,254, filed Dec. 31, 1990, now abandoned.

FIELD OF THE INVENTION

This invention is directed to a process which utilizes fluosilicic acid, phosphate rock and sulfuric acid to produce wet process phosphoric acid and hydrogen fluoride and/or fluoride salts. In the process of the present invention, the fluosilicic acid is reacted with phosphate rock in order to obtain phosphoric acid and calcium fluoride which are thereafter reacted in a crystallizer with sulfuric acid to form a gypsum slurry which is filtered to obtain a weak phosphoric acid solution and hydrogen fluoride. The resultant solution is treated to remove the hydrogen fluoride after which the hydrogen fluoride is concentrated and/or converted to fluoride salts while the phosphoric acid may be removed or transferred to a conventional phosphoric acid plant reactor associated with a system for producing wet process phosphoric acid. The use of the transferred weak phosphoric acid to a conventional phosphoric acid plant reactor will increase the production of phosphoric acid in the commercial production of wet process phosphoric acid in the conventional process.

HISTORY OF THE RELATED ART

Wet process phosphoric acid is commercially produced by chemically attacking phosphate rock within a reactor with concentrated sulfuric acid in a medium of phosphoric acid and calcium sulfate (gypsum). The resulting phosphoric acid gypsum slurry is filtered under vacuum to separate the liquid phosphoric acid product from the solid gypsum waste. Two or more stage countercurrent washes on the gypsum filter are used to provide maximum recovery of water soluble $P_2O_5$. The wash water and recovered acid are returned to the reactor to control acid concentration and percent solids. The reactor provides a vehicle for contact and reaction of the rock and sulfuric acid under the necessary conditions for the nucleation and growth of the gypsum crystals.

The above described reaction is carried out in one or more vessels each consisting of one or more agitated compartments. The process is based on the fundamentals of adding the phosphate rock and sulfuric acid to a large circulating mass of phosphoric acid and gypsum to provide uniform concentration throughout the reaction mass, constant reaction mass temperature, and proper crystal growth retention time in order to yield the highest attack and filtration efficiencies. The resulting filter or product acid containing dissolved impurities is further processed by evaporation to produce a more concentrated acid for sale or to produce other phosphate fertilizer products.

The reaction with phosphate rock, which is comprised primarily of tricalcium phosphate ($Ca_3(PO_4)_2$), calcium carbonate ($CaCO_3$) and calcium fluoride ($CaF_2$), produces carbon dioxide ($CO_2$) and hydrogen fluoride (HF) in addition to phosphoric acid and gypsum. The carbon dioxide evolves from the process while the hydrogen fluoride reacts with the silicon, or sand, left in the rock after beneficiation to produce silicon tetrafluoride($SiF_4$).

Fluorine evolves from the reaction step as silicon tetrafluoride and from the subsequent concentration step as silicon tetrafluoride and hydrogen fluoride. The distribution of fluorine from the manufacture of crude wet process phosphoric acid is as follows:

|  | % of Total F |
|---|---|
| 1. The gypsum | 10–20 |
| 2. Emissions from the reactor | 10–25 |
| 3. Vapors produced during concentration | 40–60 |
| 4. The concentrated product acid | 10–20 |

The fluoride evolved during the reaction in conventional processes is typically absorbed into pond water in order to limit the quantity of fluorides emitted from the process so as to conform to existing environmental standards. The fluorine evolved during concentration steps is either recovered as fluosilicic acid ($H_2SiF_6$) or is absorbed into the pond water used to condense the water vapor liberated during the evaporation process.

The number of phosphoric acid producers who recover fluorine as fluosilicic acid is limited. This is due to the relatively small demand of the acid for fluoridating drinking water with fluosilicic acid or its sodium salt, sodium silicofluoride ($Na_2SiF_6$), and the manufacture of cryolite and aluminum fluoride.

Because of the small demand, the bulk of the fluorine evolved during the manufacture of wet process phosphoric acid is absorbed in the cooling pond. Fluorine is evolved from the pond water when it returns to the cooling pond resulting in a fluorine pollution problem. The fluorine level in cooling ponds builds up to about 4,000 ppm for producers who recover fluosilicic acid and to about 25,000 ppm for producers who do not. At these levels it is estimated that approximately two to twenty pounds of fluorine per day per acre of cooling pond surface is emitted. Normally the cooling ponds are 100 to 500 acres in size and the nonpoint source fluorine emission to the atmosphere is significant.

In order to overcome the problems of emissions of fluorine pollutants to the environment, the inventor of the present application designed and patented a closed loop system for the elimination of fluorine pollution from phosphoric acid plants as described in U.S. Pat. No. 3,811,246, the contents of which are incorporated herein by reference. Basically, the closed loop system for removing fluorine includes a process which involves a condensing of the vapors from phosphoric acid operations, especially from a phosphoric acid vacuum evaporator, by contacting the vapors in a scrubber with an aqueous liquid which absorbs fluorine vapors. During the process by-product fluosilicic acid is intermittently recovered while the remaining acid is recycled. As previously noted however, as the demand for fluosilicic acid is limited, it is still necessary to provide storage or disposal for the recovered acid.

One alternative use for fluosilicic acid is disclosed in U.S. Pat. No. 4,557,915 to Nineuil entitled "Production of Phosphoric Acid". In this patent phosphoric acid is mixed with fluosilicic acid after which the acids are reacted with phosphate rock in the production of phosphoric acid. Unfortunately, this process requires that the fluosilicic acid always be mixed with the phosphoric acid and thereby increases the capital cost of the equipment associated with the process in manufacturing phosphoric acid. An additional prior art reference of interest is U.S. Pat. No. 2,636,806 to Ernest Winter entitled "Acidulations of Phosphate Rock".

Other prior art processes for producing phosphoric acid utilizing fluosilicic acid have been proposed, however such processes have not adequately dealt with nor been successful at removing fluorides which are commercially useful such as in the form of hydrogen fluorides at the same time phosphoric acid is generated. In British patent 2,094,282A a process for reacting phosphate rock with fluosilicic acid is disclosed wherein the phosphate and fluorine content of the rock is solubilized in a slurry which is filtered to obtain calcium silicofluoride, as a residue, and a product phosphoric acid. The calcium silicofluoride is further treated with a portion of the phosphoric acid, sulfuric acid, and water to regenerate fluosilicic acid.

In U.S. Pat. No. 1,313,379 to Hachenbleikner a process is disclosed for producing phosphoric acid which includes reacting finely ground phosphate rock with a mixture of dilute hydrofluosilicic acid and hydrofluoric acid containing gelatinous hydrosilicic acid. In the patent, it is stated that the dilute phosphoric acid produced using the process is easily filtered from insoluble materials. However, and as disclosed in U.S. Pat. No. 2,636,806 to Winter, it has been determined that such filtering is not possible. The patent to Hachenbleikner also does not provide for recovering fluorides which may be further treated to produce hydrogen fluoride.

U.S. Pat. No. 2,728,634 to Miller does disclose a method of recovering fluorine evolved from the acidulation of phosphate rock. In the process, fluosilicic acid is reacted with ammonia and thereafter the insoluble silica is readily separated from the insoluble ammonium fluoride. Such process, therefore, is dependent upon the use of ammonia in the treatment process and there is no appreciation that insoluble silica can be physically separated from solid fluoride salts, such as calcium fluoride, in order to realize a maximum recovery of hydrogen fluoride during the production of wet process phosphoric acid from fluosilicic acid and phosphate rock.

Additional patents of interest with respect to the production of wet process phosphoric acid from fluosilicic acid and phosphate rock and for recovering hydrogen fluoride are U.S. Pat. Nos. 4,557,915 to Nineui, 3,825,655 to Eipeltaner and 2,636,806 to Winter.

SUMMARY OF THE INVENTION

This invention is directed to a process for producing wet process phosphoric acid by reacting phosphate rock and fluosilicic acid, add subsequently recovering the fluorine as hydrogen fluoride in a two stage process. In the first stage, dry phosphate rock and fluosilicic acid (FSA) are reacted together in order to produce a resultant mixture of phosphoric acid, fluorspar, silicon dioxide, and undigested phosphate rock. To convert all of the fluorine in the FSA to calcium fluoride and to therefrom maximize the recovery of fluorine as hydrogen fluoride, an excess of stoichiometric amount of calcium, as the tricalcium phosphate and calcium carbonate fractions of the rock, must be added to the initial reaction slurry as dictated by the digestion efficiency of the process. Typically, this requires approximately 1.2 pounds of non-fluoride bearing calcium per pound of fluorine in the feed FSA solution. The resultant reaction slurry is filtered or centrifuged in order to separate phosphoric acid and calcium fluoride from the undigested rock and silicon dioxide. The product filtrate and wash filtrate are subsequently sent to storage. The separation of silica from the fluorine contained in the fluosilicic acid is believed to involve the hydrolysis of any calcium silicofluoride produced in the reaction slurry. Because of this hydrolysis, the reaction slurry may be retained for a predetermined period of time or cooled to further accelerate the separation of insoluble silicon dioxide from insoluble calcium fluoride prior to filtration or other mechanical separation treatments of the slurry. In some instances, where production requirements are at a minimum, the processing of the initial slurry may be carried out as a batch process so that no mechanical separation is necessary as the insoluble silicas will eventually settle out of solution.

In the second reaction stage, the mixture of phosphoric acid and fluorspar ($CaF_2$) are reacted with sulfuric acid to convert the calcium fluoride to hydrogen fluoride and gypsum. The resulting slurry is then filtered to remove insoluble gypsum leaving a solution of phosphoric acid and hydrogen fluoride. The hydrogen fluoride is thereafter stripped from the phosphoric acid and is recovered as a concentrated hydrogen fluoride solution or as anhydrous hydrogen fluoride by a distillation process. The phosphoric acid which is separated from the hydrogen fluoride is further processed to produce a more concentrated phosphoric acid which may be sold or used to produce phosphate fertilizer products.

FSA concentration is normally between 20% and 30% in the original feed stock but not lower than approximately 17% for dry rock and 20% for wet rock. If higher concentrations of FSA are utilized, a wet phosphate rock slurry containing approximately 70% solids may be used instead of a dry rock feed as described with regard to the preferred embodiment. As an alternate embodiment gypsum or a phosphoric acid/gypsum slurry may be added to the slurry containing the phosphoric acid, calcium fluoride, undigested rock, and silicon dioxide. Thereafter the resultant slurry is filtered to remove the calcium fluoride from the phosphoric acid. In this embodiment filtration rates are improved and calcium fluoride is not recovered for further processing.

In another variation of the first stage reaction, the reaction slurry is centrifuged to separate phosphoric acid and colloidal calcium fluoride mixtures from undigested rock and silicon dioxide with an addition of water to adjust the specific gravity of the slurry. In this manner the recovery of calcium fluoride during subsequent centrifugal separation is optimized.

As a further embodiment of the present process, during the second stage an excess amount of sulfuric acid, over and above that required for the conversion of calcium fluoride to hydrogen fluoride and calcium sulfate, can be added to the mixture of phosphoric acid and fluorspar. The addition of the excess sulfuric acid decreases the solubility of hydrogen fluoride in the phosphoric acid and aids in stripping all of the hydrogen fluoride from the phosphoric acid. Excess sulfuric acid is then recovered by feeding the slurry from the crystallizer to a conventional phosphoric acid plant reactor used in the processing of wet process phosphoric acid. The weak phosphoric acid introduced into the main reactor increases the production of phosphoric acid in the conventional process.

In another variation to the second stage reaction, the reaction of phosphoric acid and calcium fluoride with sulfuric acid may be carried out in a pipe reactor under elevated temperatures and pressures. The reaction mass is flashed into a separator and the hydrogen fluoride/water vapors are recovered. The phosphoric acid, gypsum, and sulfuric acid are transported to a conventional phosphoric acid plant reactor.

It is a primary objective of the present invention to produce wet process phosphoric acid by reacting phosphate rock and fluosilicic acid wherein the fluorine is recovered as hydrogen fluoride.

It is also an objective of the present invention to provide a method for producing wet process phosphoric acid which allows the producer to substantially reduce the emissions of fluorine pollutants to the environment while reducing overall production costs associated with the production of the phosphoric acid.

DESCRIPTION OF THE PREFERRED EMBODIMENT

Figure 1:
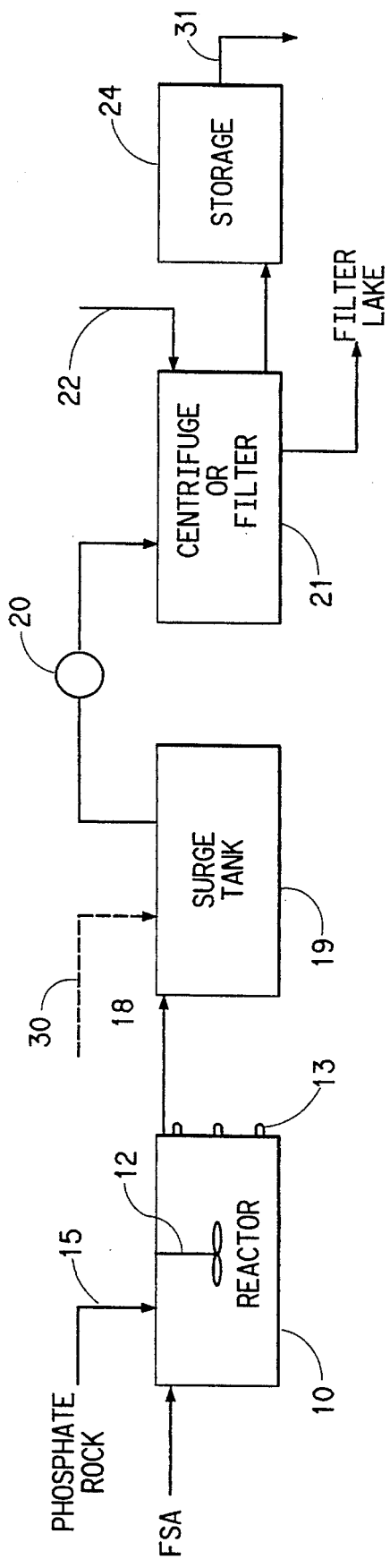
FIG. 1 is a schematic flow diagram showing the first preferred stage in a process for producing wet process phosphoric acid by reacting phosphate rock and fluosilicic acid in accordance with the present invention showing an alternate embodiment as a dotted line.

With specific reference to FIG. 1, fluosilicic acid (FSA) at concentrations of 17% to 30% are introduced into the reactor at a concentration of FSA no lower than approximately 17% when dry phosphate rock is being processed and no lower than 20% when wet phosphate rock is being processed. Reactor 10 is maintained at least approximately 90° C., normally between approximately 90°–110° C., and may include a mixing or stirring mechanism (12). The reactor may be heated by providing pressurized steam pipes in surrounding relationship with the reaction tank as shown at 13. The phosphate rock is introduced initially into reactor 10 as shown at 15. In the reactor tank, the mixture is agitated for at least 30 minutes. A constant level is maintained within the reactor with the overflow therefrom being conveyed through line 18 into a filter feed tank 19 which serves as a surge tank. In the reactor, the fluorine is converted into a nonvolatile form in order to eliminate fluoride emissions during the production of phosphoric acid.

In the present process, fluosilicic acid is reacted with phosphate rock, ultimately producing a calcium fluoride/silicon dioxide slurry. Previous reactions of phosphate rock and fluosilicic acid normally would use a calcium to fluoride stoichiometric ration of less than 1. It has now been determined that the ratio must be greeter than a stoichiometric 1. As the ratio increases, the amount of soluble silica remaining in the reactor slurry decreases. The amount of soluble silica in the reactor product is used as an indication of the conversion of the fluosilicic acid fluorine to an insoluble calcium fluoride precipitate. Normally, calcium silicofluoride is quite soluble in phosphoric acid at the concentrations being used. Therefore, as the amount of soluble silica decreases, the amount of calcium silicofluoride is also decreasing and the reaction is moving towards completion, resulting in an insoluble calcium fluoride. In the preferred embodiment, approximately 1.2 pounds of non-fluoride bearing calcium are required for each pound of fluorine in the feed FSA. In the present process, the phosphate rock contains the excess stoichiometric amount of calcium, as the tricalcium phosphate and calcium carbonate fraction of the rock.

It is suspected that the conversion of the fluorine in the fluosilicic acid to calcium fluoride may involve the intermediate step of hydrolysis of any calcium silicofluoride produced. If the intermediate chemical calcium silicofluoride is produced in the reaction phase, it is not detected in the final product, therefore, it is believed that the calcium silicofluoride hydrolyzes to silica and calcium fluoride.

In the present process, the $SiO_2$ comes from the silica contained in the fluosilicic acid used to attack the phosphate rock. In the hydrolysis step, calcium silicofluoride is hydrolyzed to form $SiO_2$, calcium fluoride, and hydrogen fluoride according to the following formulas:

$$3CaSiF_6 + 6H_2O \rightarrow 3SiO_2 + 3CaF_2 + 12HF$$

$$12HF + 2Ca_3(PO_4)_2 \rightarrow 4H_3PO_4 + 6CaF_2$$

From this reaction it is seen that the calcium silicofluoride hydrolyzes to form $SiO_2$, calcium fluoride, and hydrogen fluoride. This hydrogen fluoride reacts with phosphate rock to form phosphoric acid and calcium fluoride. This is how the calcium silicofluoride is converted into $SiO_2$ and calcium fluoride, and in the process also generates phosphoric acid.

The reactor slurry should be retained for a sufficient period of time to allow for the hydrolysis of the calcium silicofluoride to silica and calcium fluoride. Generally, the slurry should be retained within the reactor 10 or the surge tank 19 for approximately one hour.

The slurry containing phosphoric acid, calcium fluoride, undigested rock, and silica is thereafter pumped by pump 20 from the surge tank 19 into a vacuum filter or centrifuge (21) where the phosphoric acid and colloidal calcium fluoride are separated from the undigested phosphate rock and silica. A two or three step countercurrent washing across the filter by way of washing fluid admitted at 22 insures maximum recovery of phosphoric acid and calcium fluoride.

The product filtrate and wash filtrate are combined and sent to intermediate storage shown at 24. The filtered cake may be disposed of or stored as necessary.

In the first step of the process as described and shown in FIG. 1, the phosphate rock and FSA are reacted according to the following formula:

[$10Ca_3(PO_4)_2 \cdot 4.1CaF_2 \cdot 3.6CaCO_3$] +

Phosphate Rock

[$10H_2SiF_6 + 276H_2O$] ⟶ [$17.6H_3PO_4 + 259.6H_2O$] +

22.5% FSA    Phosphoric Acid

-continued

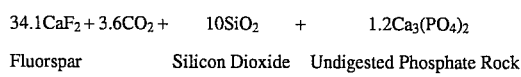

| 34.1CaF$_2$ + | 3.6CO$_2$ + | 10SiO$_2$ | + | 1.2Ca$_3$(PO$_4$)$_2$ |
|---|---|---|---|---|
| Fluorspar | | Silicon Dioxide | | Undigested Phosphate Rock |

Although the first stage of the process in obtaining the filtrate for storage at 24 may utilize dry phosphate rock, it is possible to substitute a wet phosphate rock slurry containing approximately 70% solids for the dry rock if the FSA feed in the process is maintained at a minimum concentration of 20% FSA. This will insure proper moisture content of the reaction mass and avoid producing unfilterable gelatinous silicon dioxide solids.

With specific reference to the dotted line shown in FIG. 1, a variation of the first stage process is the addition of gypsum either as gypsum or a phosphoric acid/gypsum slurry to filter feed tank 19 by way of line 30 in order to aid the filtration of the calcium fluoride from the phosphoric acid. In this process, once the slurry has been pumped by pump 20 into vacuum filter 21, only phosphoric acid is removed and the calcium fluoride remains in the unrecovered slurry.

Figure 1A:
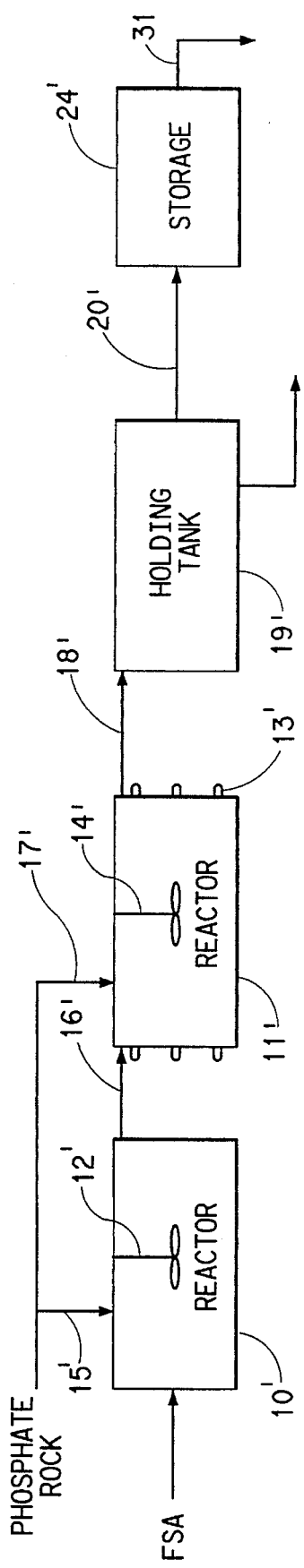
FIG. 1A is a schematic flow diagram showing the first stage of an alternate embodiment wherein the phosphate rock and fluosilicic acid are reacted in a batch process.

As opposed to the first stage process previously discussed, the phosphate rock and fluosilicic acid may be reacted in a two step reactor process. With specific reference to FIG. 1A, FSA at the same concentrations as previously discussed is introduced into a two stage reactor shown at 10' and 11'. Reactor 10' is maintained at approximately ambient temperature and may include a mixing or stirring mechanism (12'). The second stage reactor is generally maintained at an elevated temperature of approximately 90° to 100° C. by providing pressurized steam pipes in surrounding relationship with the reaction tank as shown at 13'. The second stage reactor tank may also include a stirring mechanism (14'). A portion of the dry phosphate rock is introduced initially into the first stage reactor 10' as shown at 15'. A sufficient amount of dry phosphate rock is added to convert the FSA to calcium silicofluoride and phosphoric acid at ambient temperatures. The first stage tank agitates the mixture for one to two hours. A constant level is maintained within the first stage reactor with the overflow therefrom being conveyed through line 16' into the second stage reactor. In the first stage reactor, the fluorine is converted into a nonvolatile form in order to eliminate fluoride emissions during the subsequent production of phosphoric acid. A second quantity of dry phosphate rock may be introduced through line 17' into the second stage reactor wherein the rock is acted upon by the overflow from the first stage reactor to produce additional phosphoric acid, calcium fluoride, and silica.

The additional phosphate rock is added to the second reactor to insure an excess stoichiometric amount of calcium, as the tricalcium phosphate and calcium carbonate fraction of the rock, to insure that the calcium silicofluoride is converted to calcium fluoride and silica by hydrolysis, as previously discussed. The retention time in the second reactor stage of the process may vary between one to two hours after which the slurry is conveyed through line 18' to holding tank 19' wherein the slurry is cooled thereby allowing the silica to settle out.

The phosphoric acid and colloidal calcium fluoride is selectively pumped by pump 20' into storage container 24' and the undigested phosphate rock and silica are drawn off for disposal.

As an alternative to the single and two stage reactor system described above, a single or two stage batch reactor system may be used. The phosphate rock and fluosilicic acid are simultaneously added to a reactor which is maintained at least approximately 90° C., preferably at 100° C., and may include a mixing or stirring mechanism. A reflux condenser may be added to the reactor to prevent the loss of fluosilicic acid and thereby maintain the proper calcium to fluorine ratio in the reactor mass. However, if excess calcium is available, that is, if the phosphate rock contains an excess stoichiometric amount of calcium as the tricalcium phosphate and calcium carbonate fraction of the rock, no fluorine will escape the reactor, thus, there is no need to use a reflux condenser nor expensive scrubbers to reduce fluorine emissions.

Figure 2:
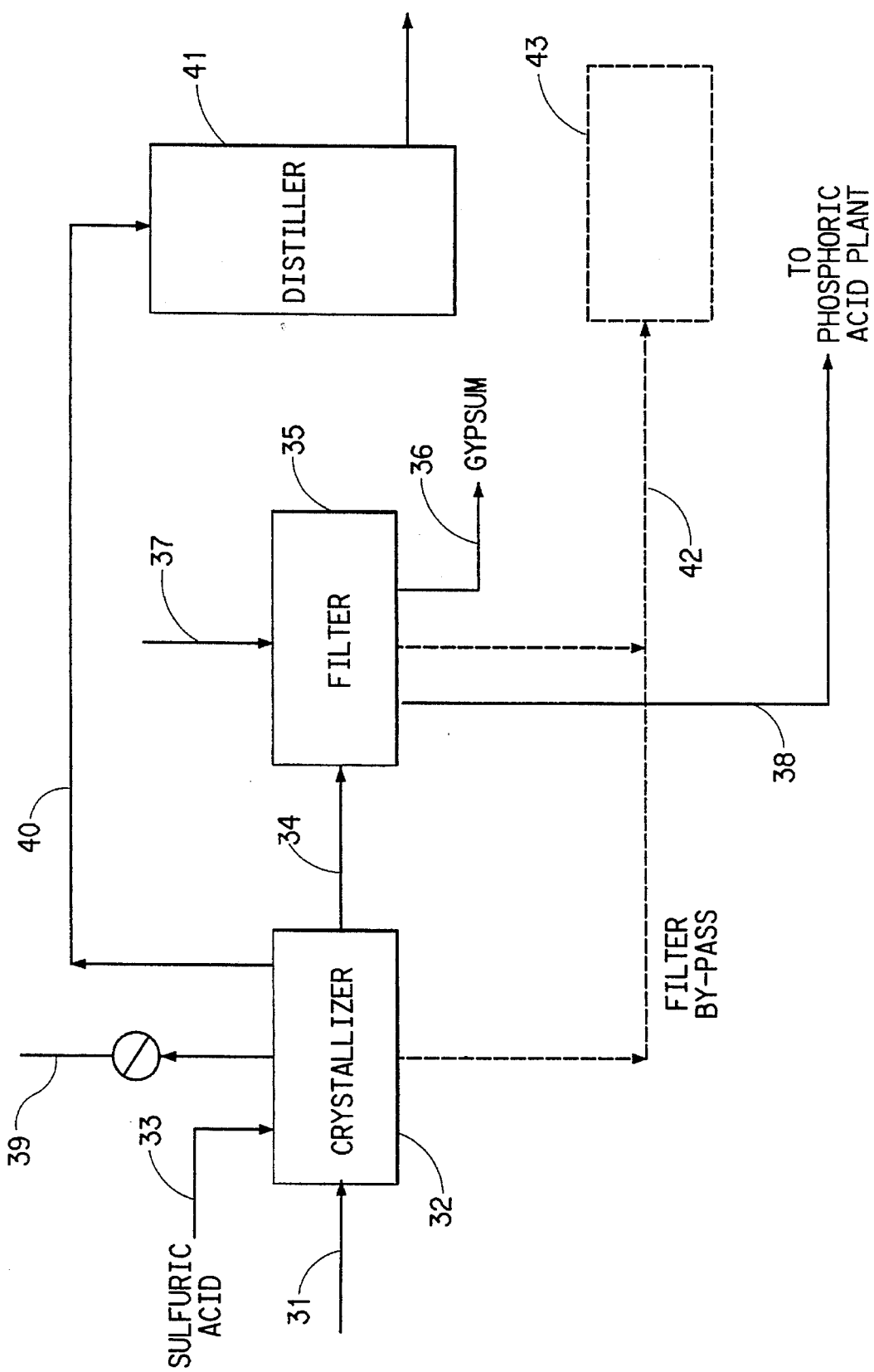
FIG. 2 is a schematic flow diagram of the preferred second stage reaction or the process of the present invention for producing hydrogen fluoride showing an alternate embodiment as dotted lines.

With specific reference to FIG. 2, the second reaction stage of the present process is shown in greater detail. In this stage phosphoric acid containing 10% to 20% P$_2$O$_5$ and 20% to 50% calcium fluoride is received from intermediate storage 24 or 24' through line 31 and introduced into crystallizer 32. Sulfuric acid is added to crystallizer 32 by way of line 33 so as to react with the calcium fluoride, thereby producing hydrogen fluoride and gypsum. The resulting phosphoric acid/hydrogen fluoride/gypsum slurry is transferred through line 34 to vacuum filter 35 wherein the liquid phosphoric acid is separated from the solid gypsum. Once separated the solid gypsum may be conveyed through line 36 for storage or disposal. In order to obtain maximum recovery of water soluble P$_2$O$_5$ and hydrogen fluoride, two or three stage countercurrent washes are provided on the gypsum filter through line 37. The wash water together with the recovered acids are conveyed through line 38 to the reactor of a conventional phosphoric acid plant.

A vacuum is applied at 39 to increase the removal of hydrogen fluoride. The stripped hydrogen fluoride/water vapor is recovered from the crystallizer through line 40 and is thereafter passed through a conventional distiller (41) in order to produce a concentrated at least 70% hydrogen fluoride solution or anhydrous hydrogen fluoride. More concentrated solutions or fluorides have been achieved up to approximately 90%.

In the second step of the process as described and shown in FIG. 2, the phosphoric acid and fluorspar are reacted with sulfuric acid in accordance with the following formula:

[17.6H$_3$PO$_4$ + 259.6H$_2$O] + 34.1CaF$_2$ +

Phosphoric Acid     Fluorspar 34.1H$_2$SO$_4$   ⟶   [17.6H$_3$PO$_4$ + 242.6H$_2$O] +

Sulfuric Acid        Phosphoric Acid 34.1CaSO$_4$·1/2H$_2$O +    68.2HF

Gypsum       Hydrogen Fluoride

The second stage reaction is preferably carried out at temperatures of between 120°–130° C. which is low enough to prevent the formation of phosphorous fluorides which are easily vaporized and which could contaminate the hydrogen fluoride vapor being recovered from the reactor or crystallizer. Retention time will vary but will generally be between ½ to 1 hour. Utilizing the present process, the amount of phosphorous in the collected hydrogen fluoride vapor is in the order of 50–100 ppm. with fluorine contents of 64%. It is generally desired to add excess sulfuric acid to the crystallizer to maintain approximately a 65° free SO$_4$ content in the reactor slurry.

By way of example, a calcium fluoride and phosphoric acid slurry was conveyed into the reactor or crystallizer 32 at a rate of 10 gms per minute. The slurry composition was 30.04% calcium, 25.4% fluorine, 12.1% P$_2$O$_5$, 0.143% silica, and 0.512% SO$_4$. Commercial 98% sulfuric acid was added to the crystallizer at a rate between 19 to 21 gms per minute.

The reactor, with a retention time of approximately 30 minutes, was operated at a temperature of 125° C., and the sulfuric acid rate was varied so as to maintain a 65% free $SO_4$ content in the reactor. The vapors from this continuous reactor were passed to a water scrubber which was preloaded with a fixed amount of deionized water and the hydrogen fluoride vapors passed through this water until the concentration of hydrogen fluoride was above 65% in the water scrubber. The actual analysis of the final scrubber water was 67.6% hydrogen fluoride, 0.0047% $P_2O_5$, 0.66% silica and less than 0.005% $SO_4$. Material balance calculations indicate that during this particular run the actual hydrogen fluoride content of the vapors leaving the reactor was approximately 92% hydrogen fluoride.

With specific reference to the dotted line portion of FIG. 2, a second embodiment of the second reaction stage of the present invention is disclosed in greater detail. In this embodiment, an excess amount of sulfuric acid is added through line 33 into crystallizer 32. The amount of sulfuric acid is above that required to convert calcium fluoride to hydrogen fluoride and calcium sulfate within the crystallizer. Preferably, approximately 2.5 times the stoichiometric amount of sulfuric acid compared with the calcium fluoride is desired. The addition of the sulfuric acid decreases the solubility of the hydrogen fluoride in the phosphoric acid and aids in stripping all of the fluorine from the phosphoric acid. The excess sulfuric acid is then recovered by feeding the crystallizer slurry, which includes a weak phosphoric acid solution, through line 42 to a conventional phosphoric acid plant reactor (43). The weak phosphoric acid in the stream which is introduced into reactor 43 will increase the production of phosphoric acid in the separate conventional process. The gypsum formed from the calcium fluoride is then filtered along with the gypsum produced in the conventional phosphoric acid plant reactor by a downstream gypsum filter (not shown). Utilizing this method, it is possible to increase the production of phosphoric acid in a separate conventional phosphoric acid plant reactor.

Figure 3:
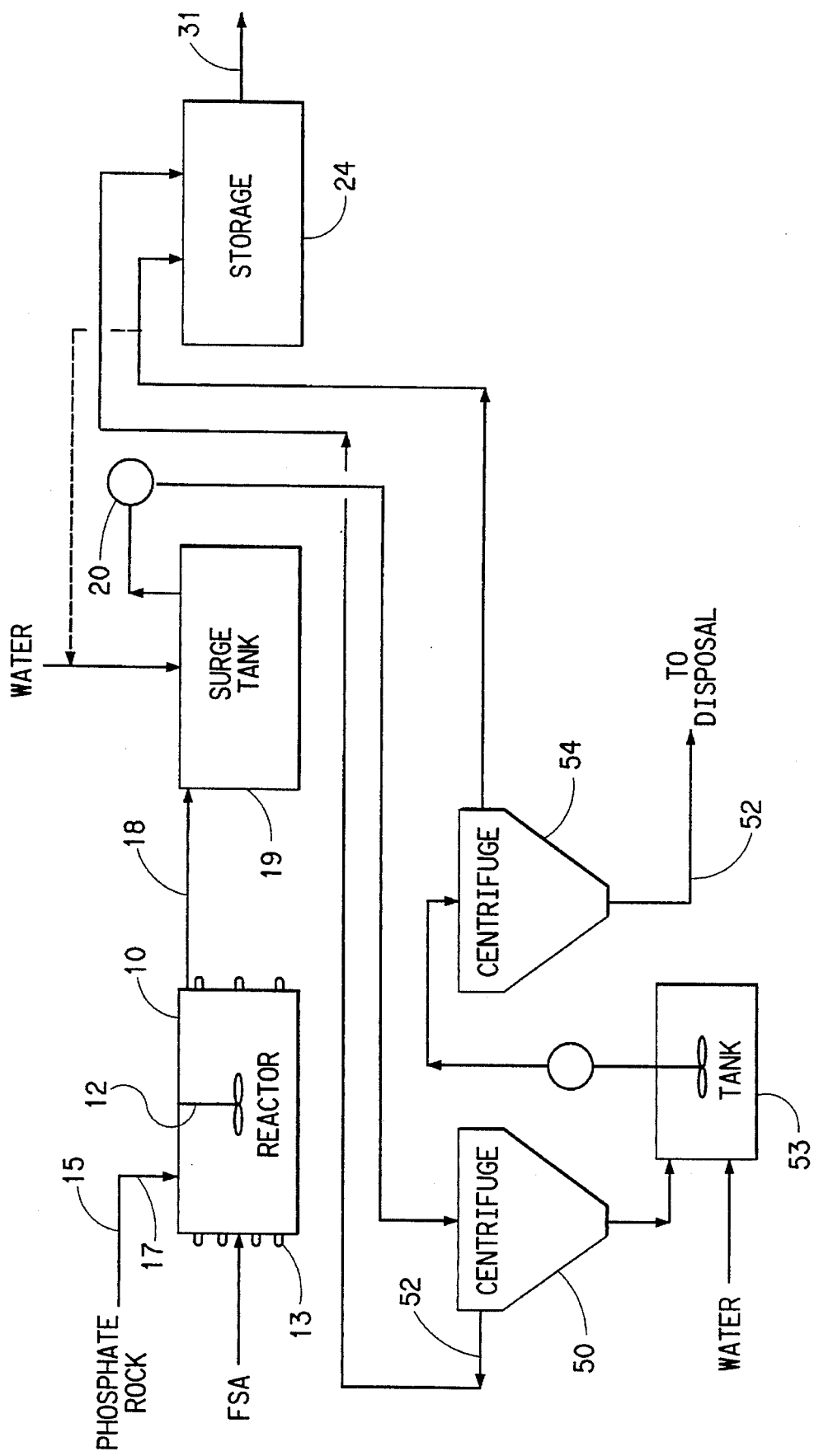
FIG. 3 is a schematic flow diagram of an alternate embodiment for the first process stage for the production of wet process phosphoric acid.

In another variation of the first reaction stage and as shown in FIG. 3, the slurry from the reactor (10) is mixed with water to control the specific gravity of the slurry. The slurry from surge tank 19 is pumped to a centrifuge for separation of the phosphoric acid and colloidal calcium fluoride mixture from the undigested rock and silica. The phosphoric acid and calcium fluoride mixture is recovered through line 52. The separated solids from the centrifuge (50) are mixed with water or recycle phosphoric acid in an agitation tank (53) and pumped to a second centrifuge (54) for recovery of additional quantities of the colloidal mixture. The solids are sent to disposal at 55 while the colloidal mixture of calcium fluoride and phosphoric acid is transferred to storage tank 24.

Figure 4:
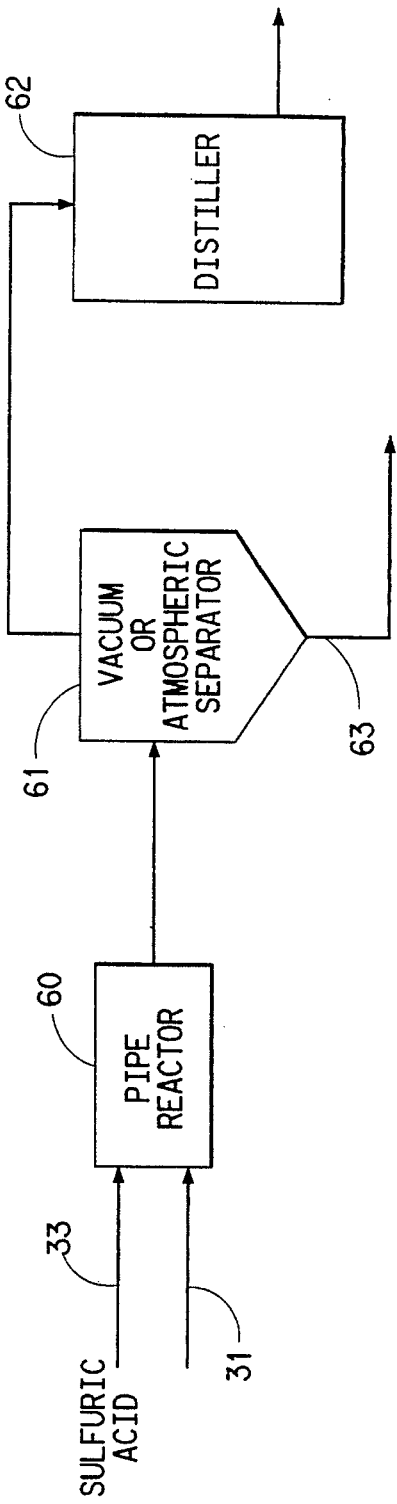
FIG. 4 is a schematic flow diagram showing an alternate embodiment for the second stage of the process of the present invention.

With particular reference to FIG. 4, in a second variation of the second reaction stage, the reaction of sulfuric acid, phosphoric acid, and calcium fluoride can be carried out in a pipe reactor (60). The pipe reactor operates at elevated pressures and temperatures which increase the volatilization of the hydrogen fluoride vapors from the reaction mass when flashed into either an atmospheric or vacuum separator (61). The hydrogen fluoride water vapor is condensed and further processed in a conventional distiller (62). The phosphoric acid, gypsum, and sulfuric acid is thereafter conveyed through line 63 to a phosphoric acid reactor for recovery of the $P_2O_5$ and sulfate, and separation of the calcium sulfate.

A third variation of the second stage reaction in crystallizer 32 involves sweeping air therethrough to strip hydrogen fluoride from the reaction mass. The air is cooled to condense hydrogen fluoride and water vapors for further processing by conventional distillation. The air cooling system is a closed loop system with the cooled air recirculated through the crystallizer to allow for the complete recovery of the stripped hydrogen fluoride without having to cool the gas to very low temperatures in order to discharge the air to the atmosphere without fluoride contamination. By utilizing air stripping it is possible to reduce the hydrogen fluoride in solution to less than 0.001%.

Another variation of the second stage reaction involves adding naturally occurring calcium fluoride (fluorspar) to the phosphoric acid/calcium fluoride slurry in order to increase the production of hydrogen fluoride relative to the $P_2O_5$ capacity of the phosphoric acid plant.

Figure 5:
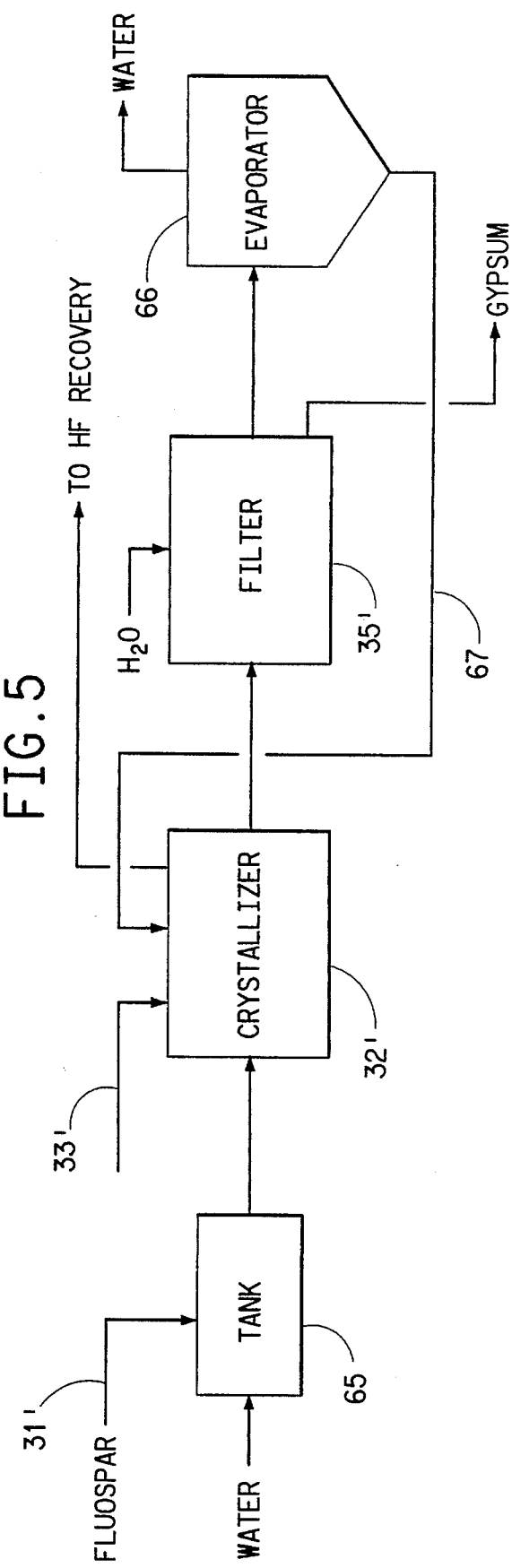
FIG. 5 is a schematic flow diagram of another alternate embodiment of the second stage of the process of the present invention.

Alternately, and as shown in FIG. 5, fluorspar can be substituted entirely for the phosphoric acid/calcium fluoride slurry. In this variation the fluorspar from line 31' is slurried with water in tank 65 prior to reaction with sulfuric acid from line 33' in crystallizer 32'. After filtration in filter 35' it is also possible in this variation to concentrate, by evaporation, the excess sulfuric acid after the hydrogen fluoride and gypsum have been separated from the acid in evaporator 66. This acid is then recycled to the second stage reaction forming a closed loop through line 67.

Figure 6:
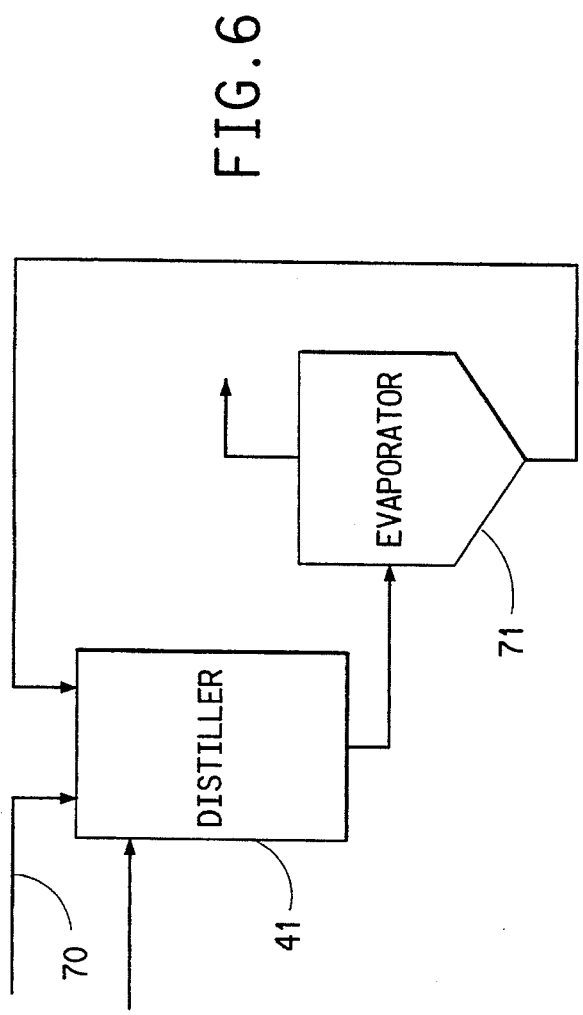
FIG. 6 is a schematic flow diagram of a process for recovering the hydrogen fluoride from the second reaction stage of the invention.

With reference to FIG. 6, the solution of water and hydrogen fluoride recovered by condensation from the second stage reaction of calcium fluoride and sulfuric acid in the presence of phosphoric acid is processed into at least a 70% (potentially up to 90%) hydrogen fluoride solution or anhydrous hydrogen fluoride through distillation, such as in distillation column 41 (FIG. 2). Since hydrogen fluoride and water form an azeotrope, it is necessary to combine the steam stripping and rectification with an azeotrope breaker, such as 80% sulfuric acid introduced through line 70, in order to recover all of the distilled hydrogen fluoride in a concentrated form. The water absorbed in the sulfuric acid is subsequently removed by evaporation in evaporator 71. The concentrated sulfuric acid is then returned to the distillation column (41) forming a closed loop.

Figure 7:
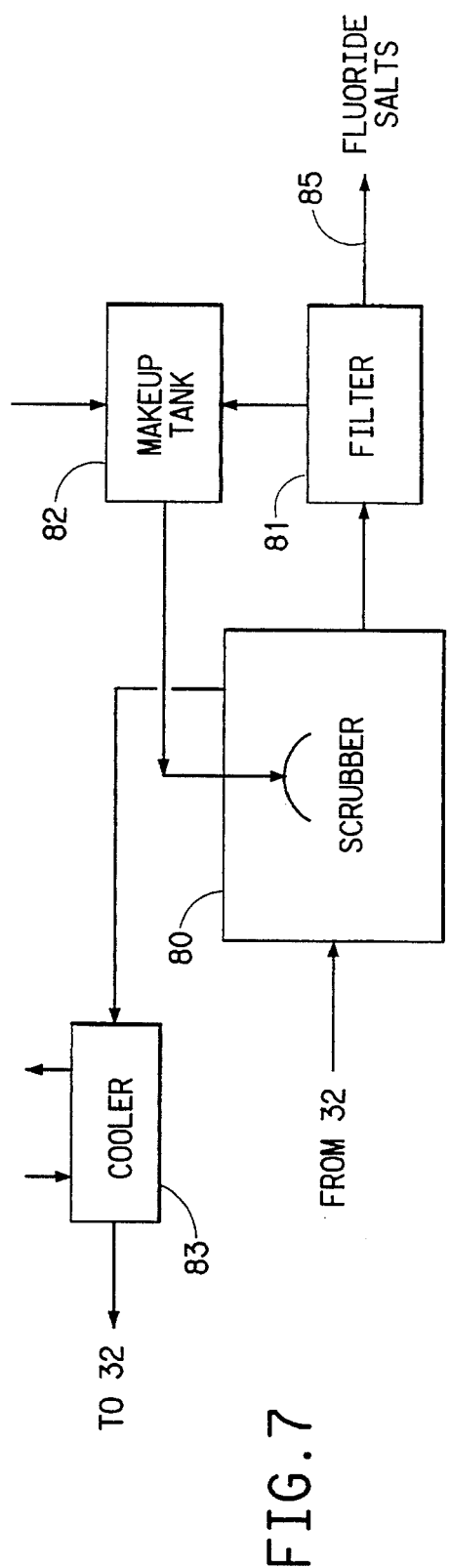
FIG. 7 is a schematic flow diagram of an alternate process for recovering the hydrogen fluoride from the second reaction stage of the invention.

In a second variation of the processing of the stripped hydrogen fluoride as shown in FIG. 7, insoluble fluoride salts are formed by contacting the hydrogen fluoride vapors in an adiabatic scrubber (80) with a recirculating scrubber solution. The scrubbing solution containing reagents (84) such as alumina trihydrate, sodium aluminate, aluminum sulfate, sodium hydroxide, sodium carbonate, or ammonia reacts with the hydrogen fluoride vapors to precipitate fluoride salts (85) such as aluminum fluoride, cryolite, sodium fluoride, sodium bifluoride, ammonium fluoride, or ammonium bifluoride. The salts are separated from the circulating solution by passing the solution through filter 81. The remaining solution is then reconstituted for reuse by passing through make-up tank 82. The vapors, after leaving the scrubber, are cooled in cooler 83 to ambient temperatures removing the water vapor and then recirculated to the phosphoric acid/hydrogen fluoride solution such as crystallizer 32, to strip more hydrogen fluoride from the solution. This is done in a closed loop so as to minimize air pollution and to increase the working concentration of hydrogen fluoride in the scrubber.

Several variations of the treatment of the sulfuric acid, phosphoric acid, hydrogen fluoride, and calcium sulfate reaction mass will be apparent to those skilled in the art.

EXAMPLE 1

Several tests were conducted starting with 22.6% fluosilicic acid, produced commercially by the Swift process, and dry phosphate rock feed. In these tests 500 grams of acid was heated to 100° C. and reacted with 320 grams of phosphate rock. The reaction was maintained at 95° C. for two hours. The solids were separated on a vacuum filter and washed with water. The analysis showed that the product acid was a mixture of phosphoric acid and calcium fluoride.

The specific results of the tests are shown in Tables 1 and 2 below.

TABLE 1

|  | TOTAL GRAMS | PERCENT BY WEIGHT | | | |
|---|---|---|---|---|---|
|  |  | $P_2O_5$ | Ca | F | Si |
| Fluosilicic Acid In | 500 | 0.029 | 0.008 | 17.9 | 4.92 |
| Phosphate Rock In | 320 | 30.66 | 32.57 | 3.37 | 4.95 |
| Wash Water In | 200 | — | — | — | — |
| Initial Filtrate | 317.3 | 14.25 | 14.37 | 14.29 | 0.44 |
| Wash Filtrate | 256.9 | 10.5 | 7.75 | 8.02 | 0.33 |
| Rejected Solids | 307.9 | 4.98 | 8.38 | 7.45 | 11.22 |

TABLE 2

|  | TOTAL GRAMS | PERCENT BY WEIGHT | | | |
|---|---|---|---|---|---|
|  |  | $P_2O_5$ | Ca | F | Si |
| Fluosilicic Acid In | 500 | 0.029 | 0.008 | 17.9 | 4.92 |
| Phosphate Rock In | 320 | 30.64 | 32.52 | 3.36 | 5.01 |
| Wash Water In | 200 | — | — | — | — |
| Initial Filtrate | 239.3 | 15.33 | 15.18 | 15.93 | 0.46 |
| Wash Filtrate | 287.6 | 12.09 | 8.7 | 9.6 | 0.39 |
| Rejected Solids | 331.1 | 5.18 | 10.73 | 7.73 | 11.43 |

EXAMPLE 2

A test was conducted where the product acid (initial filtrate and wash filtrate) from the previous example was reacted with 98% sulfuric acid producing gypsum and hydrogen fluoride. One part sulfuric acid was added to one part product acid in a glass beaker and allowed to react for ten minutes. The resulting slurry was filtered under vacuum to separate the solids.

The analysis showed that the liquid fraction was virtually free of calcium and the solids fraction was virtually free of fluorine indicating that the calcium fluoride was converted to soluble hydrogen fluoride and insoluble gypsum.

The specific results are shown in Table 3 below.

TABLE 3

|  | TOTAL GRAMS | PERCENT BY WEIGHT | | | | |
|---|---|---|---|---|---|---|
|  |  | $P_2O_5$ | Ca | F | Si | $SO_4$ |
| Product Acid In | 100 | 11.13 | 10.32 | 10.01 | 0.33 | 0.66 |
| Sulfuric Acid In | 100 | — | — | — | — | 96.0 |
| Product Acid Out* | 114.8 | 6.34 | 0.04 | 4.19 | 0.75 | 39.6 |
| Rejected Solids | 79.7 | 3.09 | 14.16 | 0.31 | 0.02 | 52.6 |

*Silicon concentration increased due to hydrogen fluoride attack of the glass beaker.

EXAMPLE 3

A test was conducted in which the closed loop air stripping of the hydrogen fluoride was incorporated into the process. In this test air was pumped for two hours at the rate of one liter per minute through the phosphoric acid/gypsum slurry resulting from the reaction of the mixture of phosphoric acid and colloidal calcium fluoride with concentrated sulfuric acid. The stripped hydrogen fluoride/water vapors were condensed from the closed loop air system and collected each hour for analysis. The analyses showed that 75% of the fluoride in the feed acid was recovered as a hydrogen fluoride solution.

Specific details are shown in Table 4.

TABLE 4

|  | TOTAL GRAMS | PERCENT BY WEIGHT FLUORINE | PERCENT DISTRIBUTION OF FLUORINE |
|---|---|---|---|
| Product Acid In | 100 | 10.33 |  |
| Sulfuric Acid In | 181 | — |  |
| Product Acid Out | 259.5 | 0.74 | 18.6 |
| First Condensate Out | 13.4 | 42.82 | 55.6 |
| Second Condensate Out | 7.2 | 27.92 | 19.5 |

In another test the air was sparged into the phosphoric acid/gypsum slurry at the rate of one liter per minute for two hours on a once through basks with the strapped hydrogen fluoride vapors absorbed in water. The analysis showed 82% of the fluorine was recovered and the fluorine content in the product acid was reduced to 0.35%.

The specific results are shown in Table 5 below.

TABLE 5

|  | TOTAL GRAMS | PERCENT BY WEIGHT FLUORINE | PERCENT DISTRIBUTION OF FLUORINE |
|---|---|---|---|
| Product Acid In | 100 | 11.78 |  |
| Sulfuric Acid In | 180 | — |  |
| HF Solution Out | 206.8 | 4.65 | 81.6 |
| Product Acid Out | 338.1 | 0.35 | 10.0 |

We claim:
1. A process comprising:
reacting phosphate rock and fluosilicic acid to produce a reaction slurry comprising phosphoric acid, calcium fluoride, silicon dioxide and undigested phosphate rock and wherein an excess stoichiometric amount of calcium to fluorine is initially present in the slurry and, thereafter
separating phosphoric acid and calcium fluoride from the undigested phosphate rock and silicon dioxide.
2. The process of claim 1 in which sufficient phosphate rock is reacted with the FSA to form a slurry in which the fluorine is converted to calcium silicofluoride and wherein the slurry is retained for a sufficient time to convert the calcium silicofluoride to calcium fluoride and silica.
3. The process of claim 2 in which the slurry is reacted for a period of at least approximately one hour in order to convert calcium silicofluoride to calcium fluoride and silica and the slurry heated to at least 90° C.
4. The process of claim 3 in which the slurry is heated to approximately 100° C.
5. The process of claim 2 in which the FSA is present in the feedstock in an amount of approximately 20% to 30% by weight and the phosphate rock feedstock is a wet phosphate rock slurry.

* * * * *